Aug. 22, 1961   W. P. KISTLER   2,996,923
GYROSCOPIC PENDULUM
Filed Oct. 24, 1958
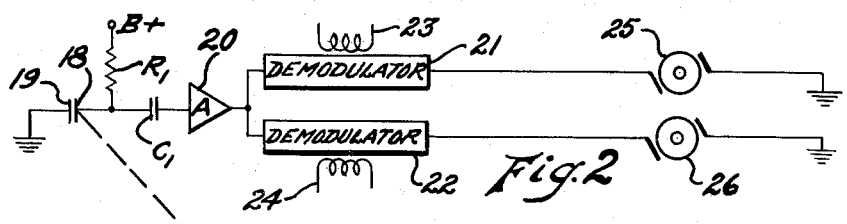
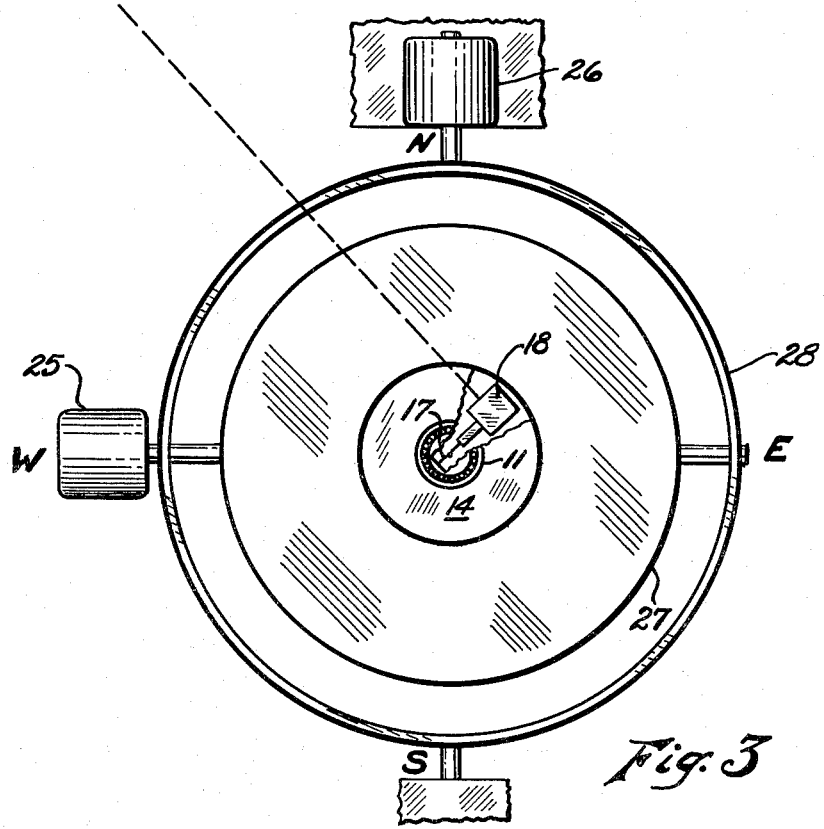
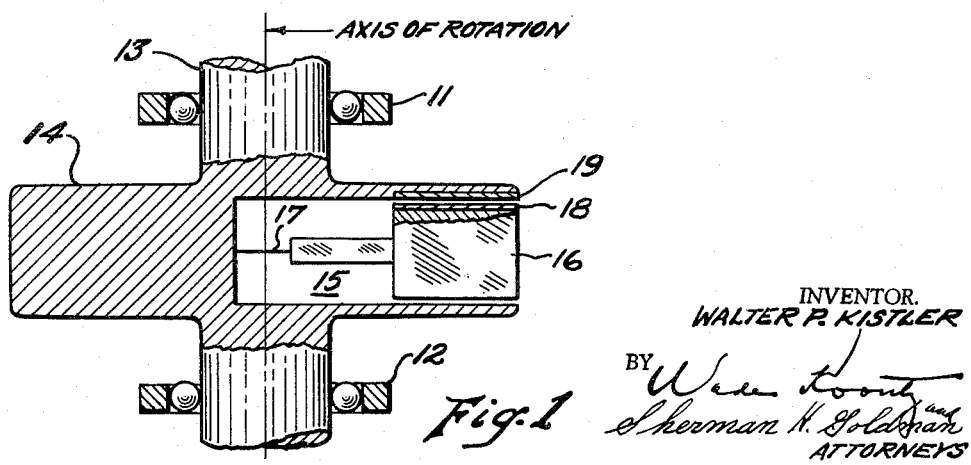
INVENTOR.
WALTER P. KISTLER
BY
Sherman H. Goldman
ATTORNEYS

United States Patent Office 2,996,923
Patented Aug. 22, 1961

2,996,923
GYROSCOPIC PENDULUM
Walter P. Kistler, Kenmore, N.Y., assignor to the United States of America as represented by the Secretary of the Air Force
Filed Oct. 24, 1958, Ser. No. 769,519
4 Claims. (Cl. 74—5.34)

This invention relates generally to gyroscope systems which are capable of accurate maintenance of a directional reference in space over long periods of time and more particularly to a gyroscopic arrangement which does not require flotation or a complex gimbal system.

Elimination of complex gimbal systems is achieved by placing a pendulum inside a rotor which is centered in two ball bearings and runs in a vacuum in order to reduce friction. A restoring torque from the cantilever spring suspension, which would cause the plane of rotation of the pendulum to precess, is compensated by displacing the suspenison of the pendulum a small distance beyond the axis of rotation of the rotor. A component from the centrifugal force acting on the pendulum is thus generated, which acts in opopsite direction to the torque of the deflected spring suspension. For a specific speed of the pendulum, both forces can be made equal and opposite. Detection of the motion of the pendulum may be achieved by a capacitive pick-off, whose signal is applied to an external servo loop which tilts the rotor so as to null the pick-off signal in applications of the gyroscopic pendulum.

Accordingly, it is an object of the invention to produce a novel gyroscopic pendulum which eliminates the need for flotation or a complex gimbal system.

It is another object of this invention to produce a gyroscopic pendulum of simple design which is cheaper to manufacture and has greater reliability over conventional two degree of freedom gyros.

It is a further object of this invention to provide a gyroscopic pendulum of less size and weight than conventional two degree of freedom gyros.

These and other advantages, features and objects of the invention will become more apparent from the following description taken in connection with the illustrative embodiment in the accompanying drawings, wherein:

FIGURE 1 shows a partial cross section of the novel mounting of a pendulum in a rotor;

FIGURE 2 is a schematic illustration of a block diagram of a correcting servo system; and FIGURE 3 illustrates schematically the application of the principle of this invention to a directional reference in space.

The partial cross sectional view of FIGURE 1 shows the application of the novel mounting of the pendulous mass in a gyroscope rotor. A pair of bearings 11 and 12 are used to journal a shaft portion 13 which may form a part of a gyro rotor 14. The center lines of these bearings thus form the axis of rotation of the device. A portion of rotor 14 is removed at 15 to provide a housing for the mounting of a pendulous mass 16. The pendulous mass 16 is connected to the rotating shaft portion 13 by means of a cantilever mounted spring 17 such that the pendulum 16 is allowed to oscillate in a plane parallel to the axis of rotation. The restoring torque from the spring suspension, which would cause the plane of rotation of the pendulum 16 to precess, is compensated by displacing the suspension of the pendulum 16 a small distance beyond the axis of rotation; therefore, a component from the centrifugal force acting on the pendulum is generated which acts in a direction opposite to the torque of the deflected spring suspension. Balance of these forces such that the pendulum 16 is not affected may be achieved for a specific speed. Thus, the elimination of the exertiton of a torque on the pendulum 16 by the pivot allows the pendulum 16 to maintain its plane of rotation in inertial space to provide a directional reference. In order to reduce errors caused by friction it is contemplated that the rotor operate in a vacuum.

Motion of the pendulum is detected by means of a capacitor pick-off comprising a pair of capacitor plates 18 and 19 secured to the mass 16 and rotor 14, respectively. The capacitor plates are connected in accordance with the schematic representation of FIGURE 2, described infra, by utilizing conventional techniques in the gyro art.

FIGURES 2 and 3 show a block diagram of a correcting servo loop and its relation to the pendulum pick-off. The spin axis of the rotor 14 is caused to tilt in order to follow very closely the motion of the plane of rotation of the pendulum 16. Assuming the ideal plane of rotation to be horizontal, then the spin axis will have to be tilted about the E-W axis, the N-S axis or about both axes depending upon the direction of tilt of the plane of rotation. The follow-up of the spin axis of the rotor is effected by means of a servo loop as shown in FIGURE 2. Pick-off capacitor 18—19 is connected through a resistor $R_1$ to a source of positive D.C. voltage (B+). Changes in relative positon of the plates 18—19 with respect to each other changes the capacity which causes a small charging current to flow through the circuit. The resulting A.C. signal generated through the capacitive pick-off has an amplitude proportional to the angle of deflection of the spin axis and its phase depends on the direction of tilt of the spin axis. This signal is fed through a coupling condenser $C_1$ to an amplifier 20 and then demodulated by two demodulators 21 and 22. A reference signal is fed to each demodulator at 23 and 24 with the same frequency as the rotation of the gyroscope. The phase of the reference signal fed at 23 to demodulator 21 is in phase with an E-W projection of the pendulum motion while the reference signal fed to demodulator 22 at 24 is 90° out of phase so as to correspond to the N-S projection of the pendulum 16. The D.C. output, therefore, of demodulator 21 is applied to the N-S tilt motor 25 and is proportional to the N-S component of tilt of the spin axis, while demodulator 22 has a D.C. output proportional to the E-W component of tilt and is applied to the E-W platform tiltmotor 26. The result of the actuation of platform tiltmotors 25 and 26 causes the platform carrying the gyroscope to follow up the plane of rotation of the pendulum 16.

FIGURE 3 shows schematically the application of tiltmotor 25 to operate the gyro platform 27 which may be mounted in a gimbal 28 to which tiltmotor 26 is connected. Thus, a directional reference in space may be maintained for extended periods.

Although the invention has been described with reference to particular embodiments, it will be understood to those skilled in the art that the invention is capable of a variety of alternative embodiments within the spirit and scope of the appended claims.

I claim:
1. A gyroscopic pendulum arrangement comprising a rotor having a hollow portion therein, and a pendulous mass mounted within said hollow portion for oscillation in a plane substantially parallel to the axis of rotation of the said rotor, the mounting for said mass comprising a cantilever spring means connecting said mass and said rotor such that said spring extends through the axis of rotation, the connecting point of said spring with said rotor being displaced beyond the axis of rotation of said rotor in a direction opposite to that of said mass.
2. A device as defined in claim 1 wherein said con- necting point is so located that a component of centrifugal force acting on said pendulous mass during rotation of said rotor asserts itself in a direction opposite to the direction of action of the torque of said cantilever spring connecting point for a predetermined speed of said rotor.

3. In a gyroscopic pendulum for maintaining a plane of reference in inertial space, a rotor having an axis of rotation, a pendulum in said rotor and means connecting said pendulum with said rotor to allow for oscillation in a plane generally parallel with the axis of rotation of said rotor, said connecting means comprising a spring pivot attached to said rotor a small distance from the axis of rotation of said rotor opposite to the direction from said axis from which said pendulum is located such that said spring pivot passes through said axis of rotation.

4. A device as defined in claim 3, including a capacitor plate on said pendulum, and a second capacitor plate on said rotor proximate to said first mentioned plate such that oscillation of said pendulum causes variation in capacitance between said plates.

References Cited in the file of this patent

UNITED STATES PATENTS

| | | |
|---|---|---|
| 1,801,619 | Arrea | Apr. 21, 1931 |
| 2,716,893 | Birdsall | Sept. 6, 1955 |
| 2,855,781 | Alburger | Oct. 14, 1958 |